US010977212B2

(12) United States Patent
Eberlein et al.

(10) Patent No.: US 10,977,212 B2
(45) Date of Patent: Apr. 13, 2021

(54) DATA PARTITIONING BASED ON ESTIMATED GROWTH

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 433 days.

(21) Appl. No.: 15/970,499

(22) Filed: May 3, 2018

(65) Prior Publication Data

US 2019/0340260 A1 Nov. 7, 2019

(51) Int. Cl.
| | | |
|---|---|---|
| *G06F 16/13* | (2019.01) | |
| *G06F 3/06* | (2006.01) | |
| *G06F 17/10* | (2006.01) | |
| *G06F 9/50* | (2006.01) | |
| *G06F 11/34* | (2006.01) | |

(52) U.S. Cl.
CPC ............ *G06F 16/13* (2019.01); *G06F 3/0644* (2013.01); *G06F 9/5061* (2013.01); *G06F 11/3476* (2013.01); *G06F 17/10* (2013.01)

(58) Field of Classification Search
CPC ....... G06F 13/16; G06F 16/278; G06F 3/0644
See application file for complete search history.

(56) References Cited

U.S. PATENT DOCUMENTS

| | | |
|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,894,602 B2 | 2/2011 | Mueller et al. |
| 7,962,920 B2 | 6/2011 | Gabriel et al. |
| 7,971,209 B2 | 6/2011 | Eberlein et al. |
| 8,126,919 B2 | 2/2012 | Eberlein |
| 8,200,634 B2 | 6/2012 | Driesen et al. |

(Continued)

OTHER PUBLICATIONS

U.S. Appl. No. 14/960,983, filed Dec. 7, 2015, Eberlein, et al.

(Continued)

*Primary Examiner* — Etienne P Leroux
*Assistant Examiner* — Farhad Agharahimi
(74) *Attorney, Agent, or Firm* — Fish & Richardson P.C.

(57) ABSTRACT

During a first delta time period, monitoring a growth in a number of records and determining a highest-growth partition in the database. The highest-growth partition is divided into subranges. During a second delta time period, a growth is monitored for each subrange. For the subrange with a greatest growth, the subrange is subdivided into sub-subranges and a growth determined for each sub-subrange. The monitoring and the determining is repeated and further subdivisions made of divisions having the highest growths until growths have been recorded for N delta time periods. For each of the N delta time periods, weighted growths are determined for each subdivision. Expected record counts are determined for each of the divisions that are expected for a subsequent time period spanning the N delta time periods. Based on the expected record counts, a partition split point within the highest-growth partition is determined, and the highest-growth partition is split into two partitions.

20 Claims, 4 Drawing Sheets

(56) References Cited

U.S. PATENT DOCUMENTS

| | | |
|---|---|---|
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,302,160 B2 | 10/2012 | Hofmann et al. |
| 8,316,422 B2 | 11/2012 | Hofmann et al. |
| 8,321,678 B2 | 11/2012 | Hofmann et al. |
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,543,994 B2 | 9/2013 | de Boer et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,724,757 B2 | 8/2017 | Barrett |
| 2008/0120129 A1 | 5/2008 | Seubert et al. |
| 2010/0153341 A1 | 6/2010 | Driesen et al. |
| 2013/0325672 A1 | 12/2013 | Odenheimer et al. |
| 2013/0332424 A1 | 12/2013 | Nos et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0229424 A1* | 8/2014 | Gislason .............. G06F 16/2282 707/602 |
| 2014/0325069 A1 | 10/2014 | Odenheimer et al. |
| 2014/0344221 A1* | 11/2014 | Novik .................. G06F 16/256 707/633 |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2017/0025441 A1 | 1/2017 | Mori |
| 2018/0357264 A1* | 12/2018 | Rice .................... G06F 16/2282 |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/356,190, filed Nov. 18, 2016, Eberlein, Peter.
U.S. Appl. No. 15/581,459, filed Apr. 28, 2017, Eberlein, et al.
U.S. Appl. No. 15/593,830, filed May 12, 2017, Eberlein, et al.
U.S. Appl. No. 15/847,627, filed Dec. 19, 2017, de Boer, et al.

* cited by examiner

DATA PARTITIONING BASED ON ESTIMATED GROWTH

The present disclosure relates to database partitions. For example, in many databases, the data volume to be managed grows constantly. With ideal database software and hardware, any number of records could be stored in one table, database software could handle any number of records, and database hardware could facilitate storing the table in one block on disk or in memory. However, because database software or hardware constraints limit the number of records that can be physically handled in one block, table partitions are used. If a table grows, the database software can create different partitions and store data in different table partitions to allow further growth of the table.

SUMMARY

The present disclosure describes techniques for partitioning databases based on a predicted growth in resulting sub-partitions. During a first delta time period, monitoring a growth in a number of records and determining a highest-growth partition in the database. The highest-growth partition is divided into subranges. During a second delta time period, a growth is monitored for each subrange. For the subrange with a greatest growth, the subrange is subdivided into sub-subranges and a growth determined for each sub-subrange. The monitoring and the determining is repeated and further subdivisions made of divisions having the highest growths until growths have been recorded for N delta time periods. For each of the N delta time periods, weighted growths are determined for each subdivision. Expected record counts are determined for each of the divisions that are expected for a subsequent time period spanning the N delta time periods. Based on the expected record counts, a partition split point within the highest-growth partition is determined, and the highest-growth partition is split into two partitions.

In a particular implementation, a computer-implemented method comprises: monitoring, during a first delta time period, a growth in a number of records in each partition of a database, and determining a highest-growth partition in the database having a highest growth among partitions in the database; for the highest-growth partition: dividing the highest-growth partition into subranges; monitoring, during a second delta time period after the first delta time period, a growth for each subrange; for the subrange with a greatest growth, subdividing the subrange into sub-subranges and determining, for each sub-subrange, a growth for each sub-subrange; repeating the monitoring and the determining of the growths for each sub-subrange, and making further subdivisions of divisions having the highest growths until growths have been recorded for N delta time periods; determining, for each of the N delta time periods, weighted growths for each subdivision; determining expected record counts for each of the divisions that are expected for a subsequent time period spanning the N delta time periods, each expected record count being a function of a current record count for the division and a sum of the weighted growths for the division; determining, based on the expected record counts for the divisions, a partition split point within the highest-growth partition; and splitting the highest-growth partition into two partitions.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. First, database partitions that are made can account for predicted growth. Second, partitioning the database can be delayed as the time increases until the next re-partition occurs. Third, partition management can facilitate the use of range-partitioning, which can be ideal for partitioning several tables similarly and can allow the execution of cross-table joins locally in one node. Fourth, the amount of data that needs to be relocated after partitioning can be minimized.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes techniques for partitioning databases based on a predicted growth in resulting sub-partitions, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

If an application uses multiple tables and joins data from the multiple tables, database performance can be improved by defining partitions of the tables in an efficient way. For example, efficiency can be improved if a data join is done between only two partitions. If different joins are defined on different columns, efficiency may not always be achieved. For example, if a Material Number column is used for joining tables, it can be beneficial also to use the Material Number column when deciding how to partition the tables. Mechanisms for managing partitioning include hash and range partitioning.

Hash partitioning can be used to distribute rows to partitions equally for load balancing. The number of the assigned partition can be computed by applying a hash function to the value of a specified column. Hash partitioning can be done without requiring an in-depth knowledge of the actual content of the table.

Range partitioning can be used to create partition based on ranges of values, for example, by part number. Range partitioning can require an in-depth knowledge of the values that are used (or are valid for) the chosen partitioning column.

Although hash partitioning can be convenient, hash partitioning can have some drawbacks. For example, as a result of data growth, a re-partitioning can require that most or all data be moved. Also, hash partitioning typically does not minimize joins across nodes using a common partitioning.

Because data partitions can be limited in size, when a number of records or some other limitation is reached, storage of further records may no longer be possible. An application using a partitioned database can experience an outage. To prevent such outages, partition capacities can be monitored over time and compared to maximum capacities, and re-partitioning can be triggered as needed to assure that the application can write new data before capacity limits are reached.

Some re-partitioning can require a data move, such as from a partition reaching capacity constraints to a new partition. When using algorithms such as hash-partitioning, for example, the re-partitioning of a database table can require moving all records in the table. This can consume considerable hardware resources, in addition to temporarily requiring additional random access memory (RAM), network, input/output (IO), and central processing unit (CPU) cycles. In addition, re-partitioning can cause downtimes for applications that use the database table if, for example, persistency management does not offer full online re-partitioning.

Applications can typically use several tables, such as database tables. The tables can be defined by a developer of the application. The developer can also define which columns of a table are to be used to organize partitioning. However, the developer cannot define, for example, how many partitions are required in an actual deployment, how to define key ranges, and how to distribute the actual data. On the other hand, a database operator (for example, an administrator) can determine data volume and data distribution and may know hardware and system constraints used to define a number of partitions and key ranges. However, the database operator's knowledge may be limited to generic considerations for all tables, and the database operator may not know application logic that may work optimally with one partitioning definition while being less than optimal with other definitions. If the knowledge of the developer reaches the administrator, metadata defining the columns can be used for partitioning. In some implementations, the metadata can be created with the application and shipped so that admin tools can use the information.

Because re-partitioning can be a costly operation with regard to resources and downtime, it is desirable to minimize the frequency of re-partitioning. While re-partitioning frequencies can be achieved by using "over-provisioning" (for example, creating many small partitions using storages with low usage), over-provisioning can result in higher hardware costs and lower performance. A balance in partition sizes can be found between distribution for growth and minimal distribution to optimize performance and hardware use. Thus, data growth needs to be analyzed (in addition to data distribution) and integrated into partition planning.

If data growth occurs symmetrically and is homogeneous in the different partitions, re-partition demand can occur less frequently but can require that all partitions need to be re-worked. However, if data growth is asymmetric (for example, new entries occur unevenly across partitions), partitions will reach capacity limits more quickly, and re-partitioning can be limited to partitions that reach capacity.

In some implementations, partitioning can be done in more efficient ways. For example, in one approach, a first step can be to define (with a table structure during development) columns that are to be used for partitioning. Then, data content and growth of the table can be monitored over time. When a table partition reaches a limit, a new partition layout can be computed using the definition, identifying the columns to be used for partitioning. The computation of the new partition can be based on computed ranges of partitions with given content and key distributions.

In some implementations, partitioning can be improved by also taking into consideration expected growth within partitions (in addition to static content). Consideration of expected growth can be facilitated, for example, by monitoring the number of records per partition and storing the values corresponding to each time delta. In this way, partitions can be identified that have the fastest growth, rather than based solely on a current number of entries.

To derive new partition layouts using growth information, partition content can be monitored on a sub-partition level. For example, if a table is partitioned into 50 sub-partitions, 5-10 sub-partitions can be monitored. Then, for an identified fastest-growing partition, sub-partitions that grow the fastest can be identified, and the new key ranges can be used to split the partition into two (or more) partitions with an expected similar growth.

In some cases, potential split points that exist for monitored sub-partitions can change dynamically during the monitoring progress. For example, the monitoring process can initially start with two sub-partitions. In a next iteration, a split can occur for the fastest growing sub-partition, and so on until a feasible number of (for example, ten) sub-partitions have been generated. The sub-partitions can then be monitored for some time, and upon a next re-partition event, the sub-partitions can be distributed among two new partitions.

In some implementations, metadata can be delivered or used in deployed systems that enable the computation of partitioning in the deployed systems. Partitioning capabilities can be database vendor specific. For example, one- or two-level partitioning can be used. Further, three types of partitioning can be used, including range partitioning that is used in the present disclosure.

Partition metadata provided for each table can include, for example, a table name and a field used for partitioning (for example, where the first level is a key field). In some implementations, a second field can be used. For example, if two-level partitioning is used, the second level allows the use of a non-key field as the second field. Partition metadata can also include a proposed partitioning type, for example, range (or one-level), range-range (or two-level), or range-hash. Partition metadata can also include table-content including, for example, a flag that indicates that data in the specified field is increasing linearly, and a reference to a number range definition, identifying fields defined for partitioning.

Figure 1:
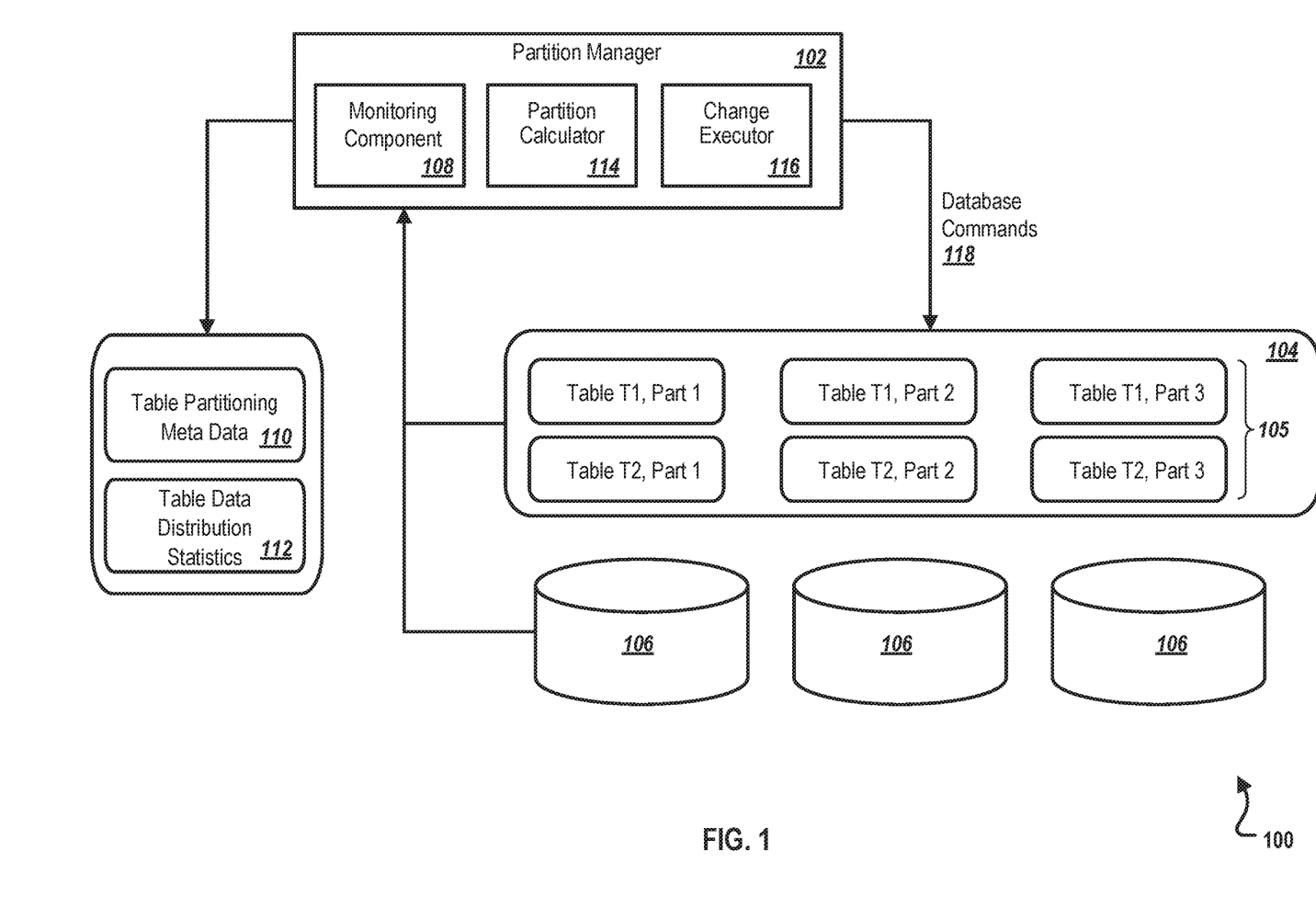
FIG. 1 is a block diagram illustrating an example of a data partitioning system, according to an implementation of the present disclosure.

FIG. 1 is a block diagram illustrating an example of a data partitioning system 100, according to an implementation of the present disclosure. The data partitioning system 100 can be used, for example, to partition databases such as relational database management system (RDBMS) databases.

The data partitioning system 100 includes a partition manager 102 for managing partitions 104 of databases 106. The partitions 104 can define specific tables and parts 105 that are partitioned.

A monitoring component 108 can be configured to read database definition information that identifies which columns are used to partition the table. Information for the columns can be used to monitor content, partitions, and subranges. The monitoring component 108 can execute at certain time intervals and reads database content to measure content in existing partitions, including number of keys and data volume. The monitoring component 108 can also compute and monitor sub-partition ranges and content and stores it, together with the subrange definitions. After a re-partition event, the subrange algorithm can be initialized to start the iterations again. The monitoring component 108 can alert (and triggers the re-partitioning) if a defined threshold is exceeded, such as a number of keys, a data volume, some other parameter, or a combination of thresholds.

A partition calculator 114 can be configured to read stored monitoring data and computes target partition ranges. The partition calculator 114 can also read definitions that identify which columns are used to partition the table. A change executor 116 can be configured to obtain the new partition range definition and compute a modify statement (for example, using a Data Definition Language (DDL)) to re-partition the table. This can be a complete offline event or an incrementally prepared downtime minimized action. Database commands 118 that are generated by the partition manager 102 can include clauses such as "ALTER TABLE . . . " that can be scheduled in order to maintain efficient timing of database updates.

As an example, partitions can be defined using column creation statements such as:

```
CREATE COLUMN TABLE M4TABLE (a INT, b INT, c INT,
PRIMARY KEY (a,b))
    PARTITION BY
        RANGE (a)
            (PARTITION 1 <= VALUES < 5,
            PARTITION 5 <= VALUES < 20),
```

-continued

```
RANGE (c)
    (PARTITION 1 <= VALUES < 5,
    PARTITION 5 <= VALUES < 20)
```

Ranges need to be computed for the partitions. For example, for a given column name, the lowest and highest value can be determined as well as the number of rows <nr_rows>. Then, depending on the number of partitions <nr_partitions> to create, the row with row number <range_size>=<nr_rows>/<nr_partitions>, 2*<range_size> and so on can be determined. These values can then be used to define the partitions.

Content in the individual partitions can be monitored. The monitoring can identify, for example, if a threshold is reached, such as based on the partition size. In an example, in Table 1 that follows, partition size threshold for re-partitioning is assumed to be 80 GB:

TABLE 1

Partition Sizes

| Time | # of Partitions | Partition | Count (millions) | Size (MB) |
|---|---|---|---|---|
| 2018 Jan. 2 10:59:00 | 1 | 1 | 735 | 58 |
| 2018 Jan. 3 10:59:00 | 1 | 1 | 795 | 62 |
| 2018 Jan. 4 10:59:00 | 1 | 1 | 845 | 72 |
| 2018 Jan. 5 10:59:00 | 1 | 1 | 914 | 76 |
| 2018 Jan. 6 10:59:00 | 1 | 1 | 953 | 81 |
| 2018 Jan. 6 23:55:00 | Split 1→2 | | | |
| 2018 Jan. 7 10:59:00 | 2 | 1 | 453 | 39 |
| 2018 Jan. 7 10:59:00 | 2 | 2 | 500 | 42 |
| 2018 Jan. 7 10:59:00 | 2 | 1 | 478 | 41 |
| 2018 Jan. 7 10:59:00 | 2 | 2 | 521 | 47 |
| . . . | | | | |

The information in Table 1 can be used to compute data growth, including growth for day 2-3 (60 M, 4 MB), day 3-4 (50 M, 10 MB), day 4-5 (69 M, 4 MB), and day 5-6 (39 M, 5 MB). Average growth can be computed as 5.75 MB/day. The growth can be determined to indicate that, after 13.9 days, the partition has grown to reach the threshold, requiring re-partitioning at 13 days.

The data can be used to monitor which partition is the biggest and which partition grows the fastest. To plan partitioning for asymmetric growth, the details of each partition can be analyzed, and five sub-partitions, for example, can be monitored:

TABLE 2

Sub-partition Monitoring

| Time | Number of Partition | Partition No. | Number of Sub-partitions | Sub No. | Subrange keys | Count (in millions) | Growth |
|---|---|---|---|---|---|---|---|
| 2018 Jan. 2 10:59:00 | 1 | 1 | 2 | 1 | <sub2_1 high key> | 400 | 0 |

TABLE 2-continued

Sub-partition Monitoring

| Time | Number of Partition | Partition No. | Number of Sub-partitions | Sub No. | Subrange keys | Count (in millions) | Growth |
|---|---|---|---|---|---|---|---|
| 2018 Jan. 2 10:59:00 | 1 | 1 | 2 | 2 | <part1 high key> | 330 + 23 | 23 |
| 2018 Jan. 3 10:59:00 | 1 | 1 | 3 | 1 | <sub3_1 high key> | 400 | 0 |
| 2018 Jan. 3 10:59:00 | 1 | 1 | 3 | 2 | <sub3_2 high key> | 170 + 42 | 42 |
| 2018 Jan. 3 10:59:00 | 1 | 1 | 3 | 3 | <part1 high key> | 183 | 0 |
| 2018 Jan. 4 10:59:00 | 1 | 1 | 4 | 1 | <sub41 high key> | 400 | 0 |
| 2018 Jan. 4 10:59:00 | 1 | 1 | 4 | 2 | <sub42 high key> | 100 + 37 | 37 |
| 2018 Jan. 4 10:59:00 | 1 | 1 | 4 | 3 | <sub43 high key> | 112 | 0 |
| 2018 Jan. 4 10:59:00 | 1 | 1 | 4 | 4 | <part1 high key> | 183 | 0 |
| 2018 Jan. 6 23:55:00 | Split 1→2 | | | | | | |
| 2018 Jan. 7 10:59:00 | 2 | 1 | 2 | 1 | ... | | |
| 2018 Jan. 7 10:59:00 | 2 | 1 | 2 | 2 | | | |
| 2018 Jan. 7 10:59:00 | 2 | 2 | 2 | 1 | ... | | |
| 2018 Jan. 7 10:59:00 | 2 | 2 | 2 | 2 | | | |
| 2018 Jan. 8 10:59:00 | 2 | 1 | 3 | 1 | ... | | |
| 2018 Jan. 8 10:59:00 | 2 | 1 | 3 | 2 | ... | | |
| 2018 Jan. 8 10:59:00 | 2 | 1 | 3 | 3 | | | |
| 2018 Jan. 8 10:59:00 | 2 | 2 | 3 | 1 | ... | | |
| 2018 Jan. 8 10:59:00 | 2 | 2 | 3 | 2 | ... | | |
| 2018 Jan. 8 10:59:00 | 2 | 2 | 3 | 3 | | | |

Range-partitioning and managing single partition ranges can be done instead of using a hash partitioning and re-partitioning the complete table when re-partitioning is required. In this way, key ranges can be computed when the growth is expected to be asymmetric because some partitions are expected to grow significantly faster than other partitions. The challenge is to compute key ranges with expected growth of some key ranges. For example, the problem is to find a key value for the new range, not simply selecting a middle row or middle value, such as using a WHERE clause. Instead, the growth in a number of rows in a partition can be measured, and statistics can be used that are related to current and projected numbers of entries. The monitoring could also be made more accurate and compute the size of the rows.

Conventional systems can identify linear increasing keys, appending a new partition at end. Information delivered with the conventional systems can specify which column to use for partitioning and whether a row has values that increase linearly. For a table partitioned on a column that contains an increasing number (for example, a sequence) of existing partitions, only the partition with the highest key values will grow. Partitions with older content can shrink (if records are deleted) or can grow (if records are updated). The partitioning approach can be to compute the largest current value and define a new partition ranging from a current value. This approach can be used for some databases handling by automatic range partitioning using an "OTHERS" partition, and a threshold, when a new OTHERS partition is automatically created:

```
CREATE COLUMN TABLE T (A VARCHAR(5) NOT NULL,
NUM INTEGER NOT NULL)
    PARTITION BY RANGE (A AS INT) (PARTITION OTHERS
DYNAMIC THRESHOLD 3000000)
```

Other conventional systems can use range management on static content. For example, the content of the single partitions can be monitored. When a partition reaches the threshold, the partition is split into two new partitions, each containing half the entries (or half the volume).

Techniques used in the present disclosure can use range management on growth data. For example, partition sizes can be monitored, and historical partition size information can be stored, including statistics from which ranges can be derived for expected content growth, not simply limited to actual content. As an example, the distribution of data we expect at some time in the future can be computed, and partitions can be split according to the expected content. Subranges can be defined for each range, and the growth of the subranges can be measured.

Figure 2:
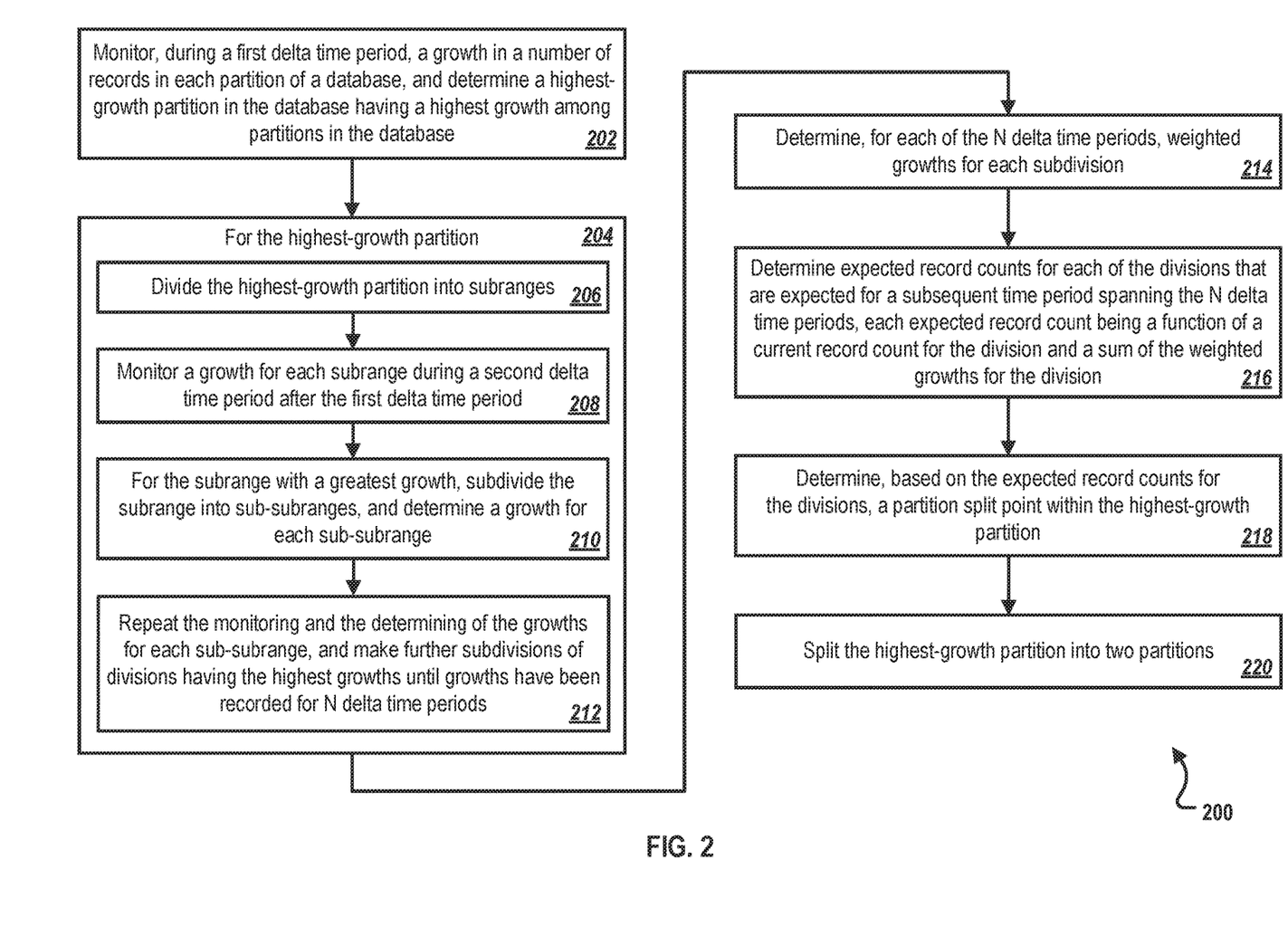
FIG. 2 is a flowchart illustrating an example of a computer-implemented method for partitioning databases, according to an implementation of the present disclosure.

FIG. 2 is a flowchart illustrating an example of a computer-implemented method 200 for partitioning databases, according to an implementation of the present disclosure.

For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a growth in a number of records in each partition of a database is monitored during a first delta time period, and a highest-growth partition in the database having a highest growth among partitions in the database is determined. For example, also referring to FIGS. 1 and 3, the partition manager 102 can determine that the partition 302 (with ten new records) has grown more than partition 304 (with one new record). The partition manager 102 can manage the partitions 104 of the databases 106, such as using monitoring, subdivisions, and calculations described with reference to FIG. 3.

Figure 3:
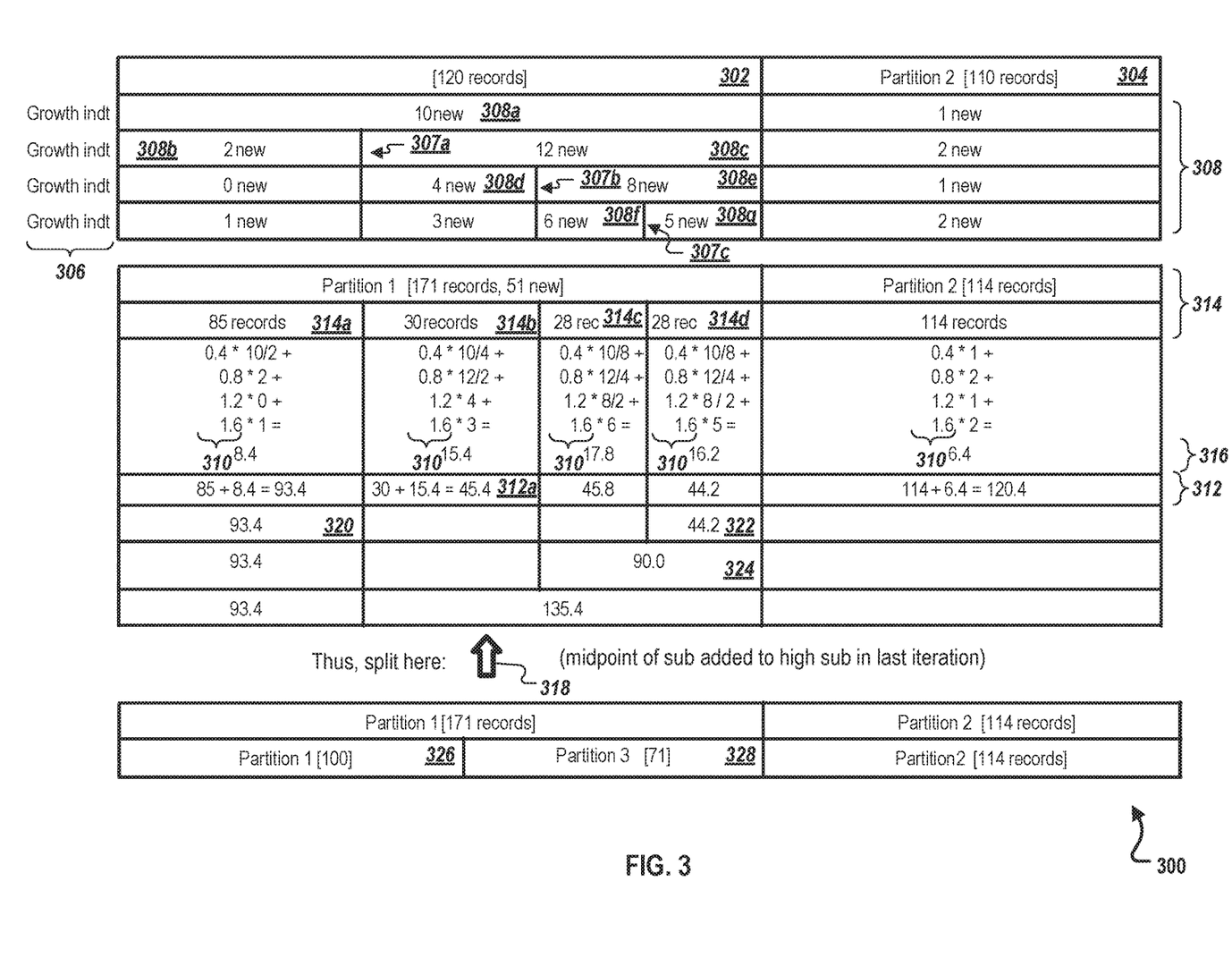
FIG. 3 is a diagram illustrating an example sequence of monitoring, subdivisions, and calculations used in a re-partitioning, according to an implementation of the present disclosure.

FIG. 3 is a diagram illustrating an example sequence of monitoring, subdivisions, and calculations 300 used in re-partitioning, according to an implementation of the present disclosure. It is assumed that the last partitioning (or the starting point of the process) was at time to. Then, a general approach to monitoring partition sizes and storing historical partition size information can include the following. The number of records for the partition (for example, partitions 302 and 304) is stored. The number of records in each sub-partition is stored. At every delta time (DT) (for example, delta times 306), a new measurement can be made, including measuring the number of records in each sub-partition, computing a new delta since "now—DT", and storing the delta. This can be done with statically defined subranges or with by iteratively adjusting subranges. From 202, method 200 proceeds to 204.

At 204, for the highest-growth partition, growth can be monitored in preparation of performing another re-partitioning. For example, for statically defined subranges, a fixed number (for example, ten) of subranges can be selected, for which there are defined ten equally-distributed ranges. The content in each subrange can be monitored, and the data can be stored for this time period. In some implementations, step 204 can be performed using sub-steps 206-212. From 204, method 200 proceeds to 206.

For iteratively adjusting subranges, the number of records in each subrange (for example, two subranges to start) can be measured. The range with the biggest change can be split (307a). For the next iteration, the number of records in the newly defined subranges can be measured. This process can be repeated, with each iteration splitting the subrange with the highest growth. The process can be shown to automatically adjust the ranges to the distribution of the data. As an example, new record counts 308 can be determined for the four delta time periods 306.

For data-key distribution, which is "clustered" and not homogeneously distributed, an iterative approach can provide better results. In this case, the procedure to compute the new range can include the following. Data growth can be monitored, and the data can be stored every DT. When the data in the partition grows above a threshold, the new partition can be computed using the following. A number N (for example, four) can be determined that identifies a number of cycles DT that have passed. Using the latest entry in the monitoring table, key ranges of the subranges and the number of entries in each subrange are determined. The growth in each subrange in the time DT is computed.

At 206, the highest-growth partition is divided into subranges. For example, the partition 302 with a new record count 308a (for example, ten, which exceeds a new record count of one new record for the partition 304) can be subdivided as shown in the split 307a. From 206, method 200 proceeds to 208.

At 208, during a second delta time period after the first delta time period, a growth for each subrange is monitored. As an example, monitoring can indicate that subdivisions produced by the split 307a include a new record count 308b of two new records and a new record count 308c of 12 new records. From 208, method 200 proceeds to 210.

In some implementations, one or both of dividing or subdividing can include determining a midpoint key value among keys of records in the division, and dividing at the midpoint key value. For example, division can occur at an alphanumeric midpoint of a range of keys, such as between the letters M and N in the alphabet.

In some implementations, one or both of dividing or subdividing can include determining a midpoint key value among keys of records in the division; and dividing at a key value at or within two records the midpoint key value, wherein the dividing places, into a same division, records related by organization or customer. For example, division can occur at a division point that places all records related to a same customer in the same partition.

At 210, for the subrange with a greatest growth, the subrange is subdivided into sub-subranges, and a growth for each sub-subrange is determined. For example, the division with the new record count 308c of 12 records can be subdivided at the split 307b. From 210, method 200 proceeds to 212.

At 212, the monitoring and the determining of the growths for each sub-subrange are repeated, and further subdivisions of divisions having the highest growths are made until growths have been recorded for N delta time periods. Subsequent monitoring can indicate new record counts 308d and 308e (four and eight new records, respectively). As a result, a split 307c can occur, and subsequent monitoring can indicate new record counts 308f and 308g. From 212 (and 204), method 200 proceeds to 214.

At 214, for each of the N delta time periods, weighted growths are determined for each subdivision. For example, after divisions and subdivisions have been made and new record counts have been monitored, then the expected growth and expected volume are computed. For each subrange, the number of keys in the subrange are determined, and the growth for all times DT in the subrange are determined. The growths are weighted by a factor that is smaller for older periods and bigger for more recent periods. The current record counts are added to the weighted growths, such as in:

$$N_{expected} = N_{current} + \text{sumof}[i=1 \ldots N](\text{weight}_i * \text{growth}_i) \quad (1).$$

If the subranges are dynamically subdivided during the monitoring period, then the growth of an older and larger subrange is equally distributed to each of the newer now subdivided subranges for Equation (1).

The weight factors can be chosen in a way to value more recent growth stronger than older growth. For example, the sum of all weight factors can equal the number of periods, and all distances between two adjacent weight factors can be equal:

$$\text{sumof}[i=1 \ldots N](\text{weight}) = N \quad (2)$$

and $$\text{weight}_{i+1} - \text{weight}_i = \text{weight}_i - \text{weight}_{i-1} \quad (3).$$

As a result, for four periods, for example, weight factors 310 can be 0.4, 0.8, 1.2 and 1.6. The smallest of the weight factors 310 can be applied to the oldest delta time period, and largest of the weight factors 310 can be applied to the newest delta time period. From 214, method 200 proceeds to 216.

At 216, expected record counts are determined for each of the divisions that are expected for a subsequent time period spanning the N delta time periods, where each expected record count is a function of a current record count for the division and a sum of the weighted growths for the division. For example, expected record counts 312 can be calculated as a total of current record counts 314 and a sum of weighted record counts 316. From 216, method 200 proceeds to 218.

At 218, a partition split point within the highest-growth partition is determined based on the expected record counts for the divisions. As an example, a partition split point 318 of the partition 302 can be determined using the current record counts 314 and the weighted record counts 316. In some implementations, the partition split point 318 can be calculated using the following steps.

First, a low-value sum of one or more of the expected record counts is determined for respective divisions having lowest value ranges of keys for records in the division. A next expected record count is iteratively added to the low-value sum, in ascending order, when a current value of the low-value sum is less than or equal to a current value of a high-value sum of one or more of the expected record counts for respective divisions having highest value ranges of keys for records in the division. For example, an initial value 320 of the lowest value sum can be 93.4 records, or the leftmost value of the expected record counts 312.

Second, the high-value sum can be created by iteratively adding, to the high-value sum, a next expected record count, in descending order, when the high-value sum is less than or equal to the low-value sum. As an example, an initial value 322 of the highest value sum can be 44.2 records, or the rightmost value of the expected record counts 312.

Third, determination of the low-value sum and the high-value sum can be repeated until one division exists for which the expected record count has not been added to either of the low-value sum or the high-value sum. For example, since the count 322 is less than the count 320, the next right-side expected record count 312 is added to the count 322 (for example, 45.8+44.2=a count 324 of 90.0). This process can continue, adding additional expected record counts 312 to respective sums, until only one expected record count 312 remains, namely expected record count 312a of 15.4 records.

Fourth, the partition split point is calculated as half of the current record count for the one division. For example, the partition split point 318 of the partition 302 (having a current record count of 171 records=120 old and 51 new) is halfway through a current record count 314b of 30. From 218, method 200 proceeds to 220.

At 220, the highest-growth partition is split into two partitions. The result is that a new partition 326 includes 100 records, which is the sum of a current record count 314a of 85 and half (or 15) of the current record count 314b of 30 records. Further, a new partition 328 includes 71 records, which is the sum of current record counts 314d and 314c (of 28 records each) and half (or 15) of the current record count 314b of 30 records. After 220, method 200 stops.

In some implementations, range management based on some type of insight (for example, scientific, educational, or business) can be used. For example, newly-defined number ranges that are based on particular needs can be cut in the middle of the range.

For some tables, key distribution can be a consequence of some particular activity, such as ranges of keys that are allocated for various reasons associated with the particular activity. For some tables, key distribution can be arbitrary, such as is a Globally Unique Identifier (GUID) is used as the key. This can occur, for example, if a column used to define partitions is a activity-related key and key range planning occurs. As an example, assume that the key range is defined on a column storing an increasing number (such as order entry number, an account number, or an invoice number) or on a semantically richer key (such as material number, which typically will have "number ranges" defined to group items). In another example, number range definitions can be used in manufacturing, such as range 1 for screws, range 2 for palatines, range 3 for cables, range 4 for chassis, and range 5 for boxes.

In some implementations, if the system determines that a user has manually defined a new key range, then the system can determine expected numbers of entries that can be expected in the newly defined range. The key range can be mapped to a table partition and used to determine which partition is to receive new entries created that have a key in the new key range. However, growth of records within defined ranges can deviate from expectations. For example, although the user has created a new range, data can still be inserted more often outside of the range, and the range may be under-used.

In some implementations, method 200 can further include determining values for the delta time periods that are expected to provide significant differences in growths of divisions determined at each respective delta time period. For example, delta time periods can be selected so that enough time elapses to provide meaningful information as to be able to monitor new record counts and identify fastest-growing divisions.

Figure 4:
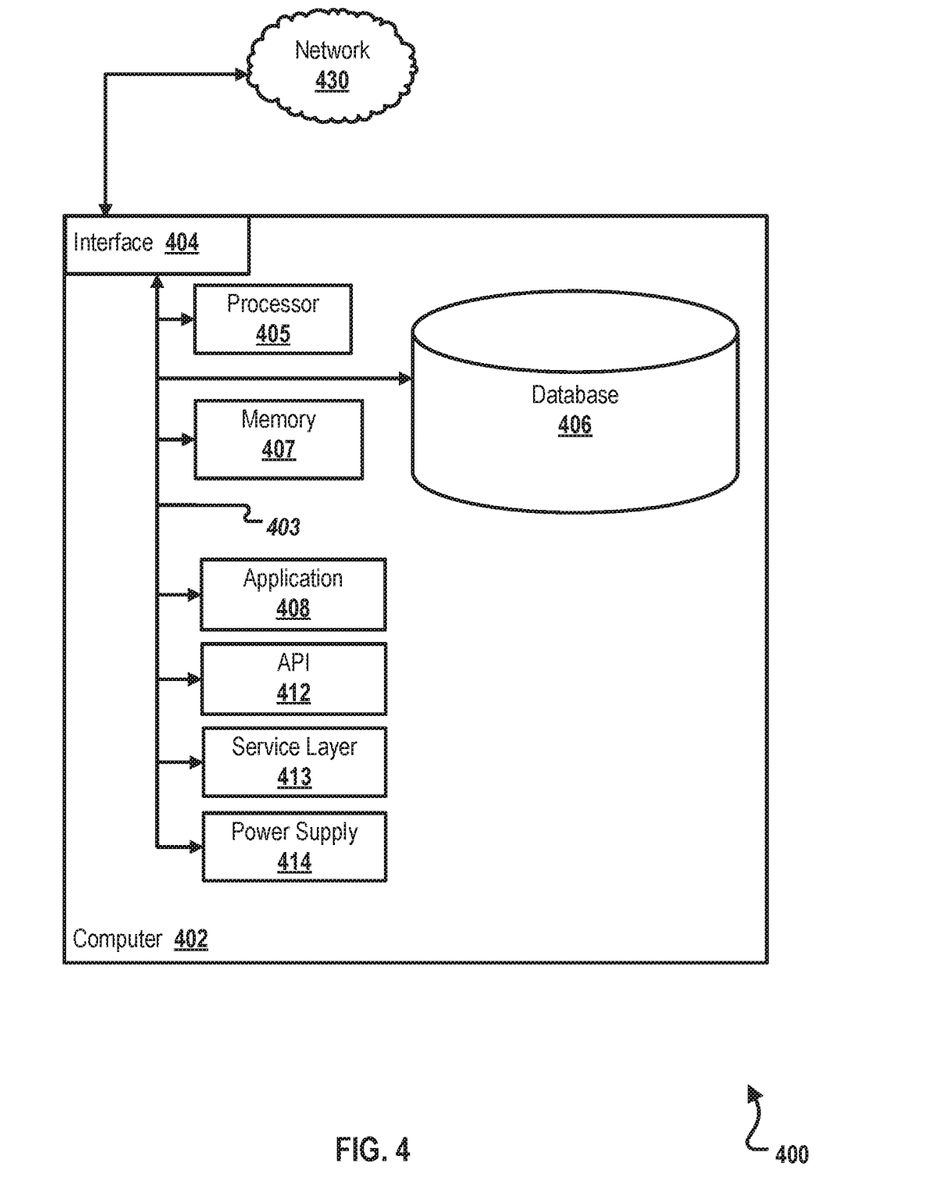
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some implementations, one or more components of the Computer 402 can be configured to operate within an environment, including cloud-computing-based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, email server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method, comprising: monitoring, during a first delta time period, a growth in a number of records in each partition of a database, and determining a highest-growth partition in the database having a highest growth among partitions in the database; for the highest-growth partition: dividing the highest-growth partition into subranges; monitoring, during a second delta time period after the first delta time period, a growth for each subrange; for the subrange with a greatest growth, subdividing the subrange into sub-subranges and determining, for each sub-subrange, a growth for each sub-subrange; repeating the monitoring and the determining of the growths for each sub-subrange, and making further subdivisions of divisions having the highest growths until growths have been recorded for N delta time periods; determining, for each of the N delta time periods, weighted growths for each subdivision; determining expected record counts for each of the divisions that are expected for a subsequent time period spanning the N delta time periods, each expected record count being a function of a current record count for the division and a sum of the weighted growths for the division; determining, based on the expected record counts for the divisions, a partition split point within the highest-growth partition; and splitting the highest-growth partition into two partitions.

The foregoing and other described implementations can each, optionally, include one or more of the following features:

A first feature, combinable with any of the following features, wherein determining the partition split point comprises: determining a low-value sum of one or more of the expected record counts for respective divisions having lowest value ranges of keys for records in the division, and iteratively adding, to the low-value sum, a next expected record count, in ascending order, when a current value of the low-value sum is less than or equal to a current value of a high-value sum of one or more of the expected record counts for respective divisions having highest value ranges of keys for records in the division; determining the high-value sum by iteratively adding, to the high-value sum, a next expected record count, in descending order, when the high-value sum is less than or equal to the low-value sum; repeating the determining of the low-value sum and the high-value sum until one division exists for which the expected record count has not been added to either of the low-value sum or the high-value sum; and calculating the partition split point as half of a current record count for the one division.

A second feature, combinable with any of the previous or following features, wherein one or both of dividing or subdividing comprises: determining a midpoint key value among keys of records in the division; and dividing at the midpoint key value.

A third feature, combinable with any of the previous or following features, wherein one or both of dividing or subdividing comprises: determining a midpoint key value among keys of records in the division; and dividing at a key value at or within two records the midpoint key value, wherein the dividing places, into a same division, records related by organization or customer.

A fourth feature, combinable with any of the previous or following features, further comprising determining values for the delta time periods that are expected to provide significant differences in growths of divisions determined at each respective delta time period.

A fifth feature, combinable with any of the previous or following features, wherein sizes of the data partitions and divisions are considered instead of numbers of records in the partitions and the divisions.

A sixth feature, combinable with any of the previous or following features, wherein monitoring includes dividing the partition into plural equally-distributed ranges and monitoring within each of the plural equally-distributed ranges.

In a second implementation, a computer-implemented system, comprising: memory storing growth information for divisions of database partitions; and a server interoperably coupled to the memory and performing operations comprising: monitoring, during a first delta time period, a growth in a number of records in each partition of a database, and determining a highest-growth partition in the database having a highest growth among partitions in the database; for the highest-growth partition: dividing the highest-growth partition into subranges; monitoring, during a second delta time period after the first delta time period, a growth for each subrange; for the subrange with a greatest growth, subdividing the subrange into sub-subranges and determining, for each sub-subrange, a growth for each sub-subrange; repeating the monitoring and the determining of the growths for each sub-subrange, and making further subdivisions of divisions having the highest growths until growths have been recorded for N delta time periods; determining, for each of the N delta time periods, weighted growths for each subdivision; determining expected record counts for each of the divisions that are expected for a subsequent time period spanning the N delta time periods, each expected record count being a function of a current record count for the division and a sum of the weighted growths for the division; determining, based on the expected record counts for the divisions, a partition split point within the highest-growth partition; and splitting the highest-growth partition into two partitions.

The foregoing and other described implementations can each, optionally, include one or more of the following features:

A first feature, combinable with any of the following features, wherein determining the partition split point comprises: determining a low-value sum of one or more of the expected record counts for respective divisions having lowest value ranges of keys for records in the division, and iteratively adding, to the low-value sum, a next expected record count, in ascending order, when a current value of the low-value sum is less than or equal to a current value of a high-value sum of one or more of the expected record counts for respective divisions having highest value ranges of keys for records in the division; determining the high-value sum by iteratively adding, to the high-value sum, a next expected record count, in descending order, when the high-value sum is less than or equal to the low-value sum; repeating the determining of the low-value sum and the high-value sum until one division exists for which the expected record count has not been added to either of the low-value sum or the high-value sum; and calculating the partition split point as half of a current record count for the one division.

A second feature, combinable with any of the previous or following features, wherein one or both of dividing or subdividing comprises: determining a midpoint key value among keys of records in the division; and dividing at the midpoint key value.

A third feature, combinable with any of the previous or following features, wherein one or both of dividing or subdividing comprises: determining a midpoint key value among keys of records in the division; and dividing at a key value at or within two records the midpoint key value, wherein the dividing places, into a same division, records related by organization or customer.

A fourth feature, combinable with any of the previous or following features, the operations further comprising determining values for the delta time periods that are expected to provide significant differences in growths of divisions determined at each respective delta time period.

A fifth feature, combinable with any of the previous or following features, wherein sizes of the data partitions and divisions are considered instead of numbers of records in the partitions and the divisions.

A sixth feature, combinable with any of the previous or following features, wherein monitoring includes dividing the partition into plural equally-distributed ranges and monitoring within each of the plural equally-distributed ranges.

In a third implementation, non-transitory computer-readable medium storing one or more instructions executable by a computer system to perform operations, comprising: monitoring, during a first delta time period, a growth in a number of records in each partition of a database, and determining a highest-growth partition in the database having a highest growth among partitions in the database; for the highest-growth partition: dividing the highest-growth partition into subranges; monitoring, during a second delta time period after the first delta time period, a growth for each subrange; for the subrange with a greatest growth, subdividing the subrange into sub-subranges and determining, for each sub-subrange, a growth for each sub-subrange; repeating the monitoring and the determining of the growths for each sub-subrange, and making further subdivisions of divisions having the highest growths until growths have been recorded for N delta time periods; determining, for each of the N delta time periods, weighted growths for each subdivision; determining expected record counts for each of the divisions that are expected for a subsequent time period spanning the N delta time periods, each expected record count being a function of a current record count for the division and a sum of the weighted growths for the division; determining, based on the expected record counts for the divisions, a partition split point within the highest-growth partition; and splitting the highest-growth partition into two partitions.

The foregoing and other described implementations can each, optionally, include one or more of the following features:

A first feature, combinable with any of the following features, wherein determining the partition split point comprises: determining a low-value sum of one or more of the expected record counts for respective divisions having lowest value ranges of keys for records in the division, and iteratively adding, to the low-value sum, a next expected record count, in ascending order, when a current value of the low-value sum is less than or equal to a current value of a high-value sum of one or more of the expected record counts for respective divisions having highest value ranges of keys for records in the division; determining the high-value sum by iteratively adding, to the high-value sum, a next expected record count, in descending order, when the high-value sum is less than or equal to the low-value sum; repeating the determining of the low-value sum and the high-value sum until one division exists for which the expected record count has not been added to either of the low-value sum or the high-value sum; and calculating the partition split point as half of a current record count for the one division.

A second feature, combinable with any of the previous or following features, wherein one or both of dividing or subdividing comprises: determining a midpoint key value among keys of records in the division; and dividing at the midpoint key value.

A third feature, combinable with any of the previous or following features, wherein one or both of dividing or subdividing comprises: determining a midpoint key value among keys of records in the division; and dividing at a key value at or within two records the midpoint key value, wherein the dividing places, into a same division, records related by organization or customer.

A fourth feature, combinable with any of the previous or following features, the operations further comprising determining values for the delta time periods that are expected to provide significant differences in growths of divisions determined at each respective delta time period.

A fifth feature, combinable with any of the previous or following features, wherein sizes of the data partitions and divisions are considered instead of numbers of records in the partitions and the divisions.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
monitoring, during a first delta time period, a growth in a number of records in each partition of a database, and determining a highest-growth partition in the database having a highest growth among partitions in the database;
for the highest-growth partition:
dividing the highest-growth partition into subranges;
monitoring, during a second delta time period after the first delta time period, a growth for each subrange;
for the subrange with a greatest growth, subdividing the subrange into sub-subranges and determining, for each sub-subrange, a growth for each sub-subrange;
repeating the monitoring and the determining of the growths for each sub-subrange, and making further subdivisions of divisions having the highest growths until growths have been recorded for N delta time periods;
determining, for each of the N delta time periods, weighted growths for each subdivision;
determining expected record counts for each of the divisions that are expected for a subsequent time period spanning the N delta time periods, each expected record count being a function of a current record count for the division and a sum of the weighted growths for the division;

determining, based on the expected record counts for the divisions, a partition split point within the highest-growth partition; and splitting the highest-growth partition into two partitions.

2. The computer-implemented method of claim 1, wherein determining the partition split point comprises:

determining a low-value sum of one or more of the expected record counts for respective divisions having lowest value ranges of keys for records in the division, and iteratively adding, to the low-value sum, a next expected record count, in ascending order, when a current value of the low-value sum is less than or equal to a current value of a high-value sum of one or more of the expected record counts for respective divisions having highest value ranges of keys for records in the division;

determining the high-value sum by iteratively adding, to the high-value sum, a next expected record count, in descending order, when the high-value sum is less than or equal to the low-value sum;

repeating the determining of the low-value sum and the high-value sum until one division exists for which the expected record count has not been added to either of the low-value sum or the high-value sum; and calculating the partition split point as half of a current record count for the one division.

3. The computer-implemented method of claim 1, wherein one or both of dividing or subdividing comprises:

determining a midpoint key value among keys of records in the division; and dividing at the midpoint key value.

4. The computer-implemented method of claim 2, wherein one or both of dividing or subdividing comprises:

determining a midpoint key value among keys of records in the division; and dividing at a key value at or within two records the midpoint key value, wherein the dividing places, into a same division, records related by organization or customer.

5. The computer-implemented method of claim 1, further comprising determining values for the delta time periods that are expected to provide significant differences in growths of divisions determined at each respective delta time period.

6. The computer-implemented method of claim 1, wherein sizes of the data partitions and divisions are considered instead of numbers of records in the partitions and the divisions.

7. The computer-implemented method of claim 1, wherein monitoring includes dividing the partition into plural equally-distributed ranges and monitoring within each of the plural equally-distributed ranges.

8. A computer-implemented system, comprising:

memory storing growth information for divisions of database partitions; and a server including at least one processor, the at least one processor interoperably coupled to the memory and performing operations comprising:

monitoring, during a first delta time period, a growth in a number of records in each partition of a database, and determining a highest-growth partition in the database having a highest growth among partitions in the database;

for the highest-growth partition:

dividing the highest-growth partition into subranges;

monitoring, during a second delta time period after the first delta time period, a growth for each subrange;

for the subrange with a greatest growth, subdividing the subrange into sub-subranges and determining, for each sub-subrange, a growth for each sub-subrange;

repeating the monitoring and the determining of the growths for each sub-subrange, and making further subdivisions of divisions having the highest growths until growths have been recorded for N delta time periods;

determining, for each of the N delta time periods, weighted growths for each subdivision;

determining expected record counts for each of the divisions that are expected for a subsequent time period spanning the N delta time periods, each expected record count being a function of a current record count for the division and a sum of the weighted growths for the division;

determining, based on the expected record counts for the divisions, a partition split point within the highest-growth partition; and splitting the highest-growth partition into two partitions.

9. The computer-implemented system of claim 8, wherein determining the partition split point comprises:

determining a low-value sum of one or more of the expected record counts for respective divisions having lowest value ranges of keys for records in the division, and iteratively adding, to the low-value sum, a next expected record count, in ascending order, when a current value of the low-value sum is less than or equal to a current value of a high-value sum of one or more of the expected record counts for respective divisions having highest value ranges of keys for records in the division;

determining the high-value sum by iteratively adding, to the high-value sum, a next expected record count, in descending order, when the high-value sum is less than or equal to the low-value sum;

repeating the determining of the low-value sum and the high-value sum until one division exists for which the expected record count has not been added to either of the low-value sum or the high-value sum; and calculating the partition split point as half of a current record count for the one division.

10. The computer-implemented system of claim 8, wherein one or both of dividing or subdividing comprises:

determining a midpoint key value among keys of records in the division; and dividing at the midpoint key value.

11. The computer-implemented system of claim 9, wherein one or both of dividing or subdividing comprises:

determining a midpoint key value among keys of records in the division; and dividing at a key value at or within two records the midpoint key value, wherein the dividing places, into a same division, records related by organization or customer.

12. The computer-implemented system of claim 8, the operations further comprising determining values for the delta time periods that are expected to provide significant differences in growths of divisions determined at each respective delta time period.

13. The computer-implemented system of claim 8, wherein sizes of the data partitions and divisions are considered instead of numbers of records in the partitions and the divisions.

14. The computer-implemented system of claim 8, wherein monitoring includes dividing the partition into plural equally-distributed ranges and monitoring within each of the plural equally-distributed ranges.

15. A non-transitory, computer-readable medium storing one or more instructions executable by a computer system to perform operations, comprising:
    monitoring, during a first delta time period, a growth in a number of records in each partition of a database, and determining a highest-growth partition in the database having a highest growth among partitions in the database;
    for the highest-growth partition:
        dividing the highest-growth partition into subranges;
        monitoring, during a second delta time period after the first delta time period, a growth for each subrange;
        for the subrange with a greatest growth, subdividing the subrange into sub-subranges and determining, for each sub-subrange, a growth for each sub-subrange;
        repeating the monitoring and the determining of the growths for each sub-subrange, and making further subdivisions of divisions having the highest growths until growths have been recorded for N delta time periods;
    determining, for each of the N delta time periods, weighted growths for each subdivision;
    determining expected record counts for each of the divisions that are expected for a subsequent time period spanning the N delta time periods, each expected record count being a function of a current record count for the division and a sum of the weighted growths for the division;
    determining, based on the expected record counts for the divisions, a partition split point within the highest-growth partition; and
    splitting the highest-growth partition into two partitions.

16. The non-transitory, computer-readable medium of claim 15, wherein determining the partition split point comprises:
    determining a low-value sum of one or more of the expected record counts for respective divisions having lowest value ranges of keys for records in the division, and iteratively adding, to the low-value sum, a next expected record count, in ascending order, when a current value of the low-value sum is less than or equal to a current value of a high-value sum of one or more of the expected record counts for respective divisions having highest value ranges of keys for records in the division;
    determining the high-value sum by iteratively adding, to the high-value sum, a next expected record count, in descending order, when the high-value sum is less than or equal to the low-value sum;
    repeating the determining of the low-value sum and the high-value sum until one division exists for which the expected record count has not been added to either of the low-value sum or the high-value sum; and
    calculating the partition split point as half of a current record count for the one division.

17. The non-transitory, computer-readable medium of claim 15, wherein one or both of dividing or subdividing comprises:
    determining a midpoint key value among keys of records in the division; and
    dividing at the midpoint key value.

18. The non-transitory, computer-readable medium of claim 16, wherein one or both of dividing or subdividing comprises:
    determining a midpoint key value among keys of records in the division; and
    dividing at a key value at or within two records the midpoint key value, wherein the dividing places, into a same division, records related by organization or customer.

19. The non-transitory, computer-readable medium of claim 15, the operations further comprising determining values for the delta time periods that are expected to provide significant differences in growths of divisions determined at each respective delta time period.

20. The non-transitory, computer-readable medium of claim 15, wherein sizes of the data partitions and divisions are considered instead of numbers of records in the partitions and the divisions.

* * * * *